US012073757B2

(12) United States Patent
Lien et al.

(10) Patent No.: US 12,073,757 B2
(45) Date of Patent: Aug. 27, 2024

(54) BLANK SUB-FIELD DRIVING METHOD FOR A DISPLAY DEVICE

(71) Applicant: HUAWEI TECHNOLOGIES CO., LTD., Guangdong (CN)

(72) Inventors: Cheng-Chieh Lien, Yokohama (JP); Akira Sakaigawa, Yokohama (JP)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/165,054

(22) Filed: Feb. 6, 2023

(65) Prior Publication Data

US 2023/0230520 A1 Jul. 20, 2023

Related U.S. Application Data

(63) Continuation of application No. PCT/CN2020/107384, filed on Aug. 6, 2020.

(51) Int. Cl.
*G09G 3/20* (2006.01)
*G09G 3/32* (2016.01)

(52) U.S. Cl.
CPC ............ *G09G 3/2011* (2013.01); *G09G 3/32* (2013.01); *G09G 2310/08* (2013.01); *G09G 2320/064* (2013.01); *G09G 2360/16* (2013.01)

(58) Field of Classification Search
CPC ........................................................ G09G 3/32
See application file for complete search history.

(56) References Cited

U.S. PATENT DOCUMENTS

| | | | |
|---|---|---|---|
| 5,189,406 | A | 2/1993 | Humphries et al. |
| 2003/0197667 | A1 | 10/2003 | Numao |
| 2005/0275647 | A1 | 12/2005 | Numao |
| 2007/0132792 | A1 | 6/2007 | Kimura |
| 2009/0122055 | A1 | 5/2009 | Senda et al. |

(Continued)

FOREIGN PATENT DOCUMENTS

| | | | |
|---|---|---|---|
| CN | 101751866 | A | 6/2010 |
| CN | 102097070 | A | 6/2011 |
| CN | 102968966 | A | 3/2013 |

(Continued)

OTHER PUBLICATIONS

Machine Translation Chen et al. Pub. No. CN 111179819 A May 19, 2020 (Year: 2023).*

(Continued)

*Primary Examiner* — Gustavo Polo
(74) *Attorney, Agent, or Firm* — Fish & Richardson P.C.

(57) ABSTRACT

The present invention provides an operating method of a display device. An example operating method includes driving each pixel for each frame, wherein a plurality of pixels of the display device are disposed in an array of rows and columns, a period of one frame comprises one or more data sections and one or more off-sections, ratios of time length of the one or more data sections are substantially the same as a sequence of powers of 2, each of the one or more data sections corresponds to an ON period or an OFF period related to a specified brightness, grey scale color, or luminance, and each of the one or more off-sections corresponds to the OFF period unrelated to the specified brightness, grey scale color, or luminance.

20 Claims, 11 Drawing Sheets

(56) References Cited

U.S. PATENT DOCUMENTS

| | | | |
|---|---|---|---|
| 2013/0050299 A1 | 2/2013 | Yoshinaga | |
| 2014/0368561 A1 | 12/2014 | Liao et al. | |

FOREIGN PATENT DOCUMENTS

| | | | | |
|---|---|---|---|---|
| CN | 107256691 A | | 10/2017 | |
| CN | 110599948 A | | 12/2019 | |
| CN | 111149148 A | | 5/2020 | |
| CN | 111179819 A | * | 5/2020 | ............... G09G 3/32 |
| CN | 111179819 A | | 5/2020 | |
| EP | 0261900 B1 | | 11/1993 | |
| JP | 2853998 B2 | | 2/1999 | |
| JP | 2000089731 A | | 3/2000 | |
| JP | 2002049346 A | | 2/2002 | |
| JP | 2002278501 A | | 9/2002 | |
| JP | 2004004501 A | | 1/2004 | |
| JP | 2005099712 A | | 4/2005 | |
| JP | 2006030946 A | | 2/2006 | |
| JP | 2006507523 A | | 3/2006 | |
| JP | 2007163580 A | | 6/2007 | |
| JP | 2008070885 A | | 3/2008 | |
| JP | 2013050680 A | | 3/2013 | |
| KR | 100805609 B1 | | 2/2008 | |
| KR | 20150082946 A | | 7/2015 | |

OTHER PUBLICATIONS

Extended European Search Report in European Appln No. 20947892.4, dated Jul. 31, 2023, 10 pages.

International Search Report and Written Opinion in International Appln. No. PCT/CN2020/107384, mailed on May 6, 2021, 10 pages.

Office Action in Japanese Appln. No. 2023-507657, mailed on Mar. 5, 2024, 9 pages (with English translation).

Office Action in Korean Appln. No. 10-2023-7007514, mailed on Jun. 10, 2024, 11 pages (with English translation).

* cited by examiner

BLANK SUB-FIELD DRIVING METHOD FOR A DISPLAY DEVICE

CROSS-REFERENCE TO RELATED APPLICATIONS

This application is a continuation of International Application No. PCT/CN2020/107384, filed on Aug. 6, 2020, the disclosure of which is hereby incorporated by reference in its entirety.

TECHNICAL FIELD

The present invention generally relates to a method for driving a display device with pulse-width modulation (PWM).

BACKGROUND

The technology for light emitting diode (LED) displays has been increasingly developed in recent years. It has a large potential in the flat panel display market. The LED displays can be used in not only large panels such as TV and PC screens, but also tablets, smartphones, and wearable devices. Based on its high PPI (pixels per inch), it also has high potential to be used in AR/VR (augmented reality/virtual reality) application. In the future, micro-LED display can replace LCDs and even also OLED displays.

In order to display a grey scale color, the micro-LED display is driven in the time domain by using PWM, due to the characteristic different from a liquid crystal display (LCD) and an organic light emitting diode (OLED) display. However, if the number of bits for specifying grey scale colors and the number of lines of a display device increase, the time for driving each pixel becomes short and is insufficient to complete the process.

SUMMARY

An operating method of a display device is provided to increase available data driving time.

According to a first aspect, an operating method of a display device is provided, where the method includes driving each pixel for each frame, wherein a plurality of pixels of the display device are disposed in an array of rows and columns, a period of one frame includes one or more data sections and one or more off-sections so that ratios of time length of the data sections are substantially the same as a sequence of powers of 2, each data section corresponds to an ON or OFF period related to the specified brightness, grey scale color, or luminance, and each off-section corresponds to an OFF period unrelated to a specified brightness, grey scale color, or luminance.

In a possible implementation, GSU and Off_section are selected so that the following equation is satisfied:

$$CY \times SF\_\text{number} = GSU \times (DSW\_\text{sum} - 1) + Off\_\text{section}$$

where CY×SF_number corresponds to the period of one frame, SF_number is a number of sub-fields in one frame and is set to a number of the rows, CY is a number of units of time in one sub-field and is set to n+1, n is a number of bits of data for specifying the brightness, grey scale color, or luminance, GSU is a number of units of time corresponding to a minimum ON period, DSW_sum is a sum of weights of the data sections and is set to 2^n−1, and Off_section is a number of units of time corresponding to the Off-section.

In a possible implementation, the driving each pixel for each frame includes driving each pixel for each frame with pulse-width modulation (PWM).

In a possible implementation, the array corresponds to a part of the display device.

In a possible implementation, the pixel includes a thin film transistor (TFT).

In a possible implementation, the pixel includes a silicon substrate.

In a possible implementation, Vcc is applied to the pixel in an ON period, and Vss is applied to the pixel in the OFF period.

In a possible implementation, the display device is a micro-LED display.

According to a second aspect, a display device is provided, where the display device includes a plurality of pixels disposed in an array of rows and columns, a period of one frame includes one or more data sections and one or more off-sections so that ratios of time length of the data sections are substantially the same as a sequence of powers of 2, each data section corresponds to an ON or OFF period related to the specified brightness, grey scale color, or luminance, and each off-section corresponds to an OFF period unrelated to a specified brightness, grey scale color, or luminance, and a driver configured to drive each pixel for each frame.

In a possible implementation, GSU and Off_section are selected so that the following equation is satisfied:

$$CY \times SF\_\text{number} = GSU \times (DSW\_\text{sum} - 1) + Off\_\text{section}$$

where CY×SF_number corresponds to the period of one frame, SF_number is a number of sub-field in one frame and is set to a number of the rows, CY is a number of units of time in one sub-field and is set to n+1, n is a number of bits of data for specifying the brightness, grey scale color, or luminance, GSU is a number of units of time corresponding to a minimum ON period, DSW_sum is a sum of weights of the data sections and is set to 2^n−1, and Off_section is a number of units of time corresponding to the Off-section.

In a possible implementation, the driver is further configured to drive each pixel for each frame with pulse-width modulation (PWM).

In a possible implementation, the array corresponds to a part of the display device.

In a possible implementation, the pixel includes a thin film transistor (TFT).

In a possible implementation, the pixel includes a silicon substrate.

In a possible implementation, Vcc is applied to the pixel in the ON period, and Vss is applied to the pixel in the OFF period.

In a possible implementation, the display device is a micro-LED display.

BRIEF DESCRIPTION OF DRAWINGS

To describe the technical solutions in the embodiments of the present invention or in the prior art more clearly, the following briefly introduces the accompanying drawings required for describing the embodiments or the prior art. The accompanying drawings in the following description show merely some embodiments of the present invention, and a person of ordinary skill in the art may still derive other drawings from these accompanying drawings without creative efforts.

DESCRIPTION OF EMBODIMENTS

The following clearly and completely describes the technical solutions in the embodiments of the present invention with reference to the accompanying drawings in the embodiments of the present invention. The described embodiments are only some but not all of the embodiments of the present invention. All other embodiments obtained by a person of ordinary skill in the art based on the embodiments of the present invention without creative efforts shall fall within the protected scope of the present invention.

Figure 1:
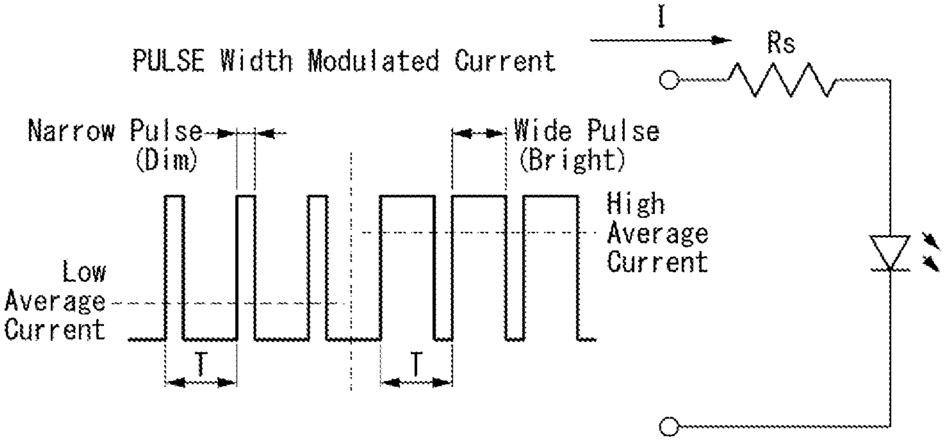
FIG. 1 shows a simplified diagram of a PWM light control.

FIG. 1 shows a simplified diagram of a PWM light control. The PWM is widely used for driving a light emitting diode (LED). The LED is controlled according to the pulse width so that the LED has different accumulate energy and then has different luminance to achieve different grey scale color. The PWM is to modulate turn-on ratio, or called duty cycle in a period. The higher turn-on ratio be in the period, the higher accumulate energy the LED gets, and the higher accumulate energy the LED gets, the higher luminance the LED provides, and vice versa. For display applications, the PWM period is often set as same as a frame period.

A pixel may be a circuit for emitting light with a specified color and a specified brightness, grey scale, or luminance. A set of LEDs with red, blue, and green colors may be used for each pixel. However, the embodiments of the present invention focus on controlling brightness, grey scale, or luminance of each LED.

Figure 2:
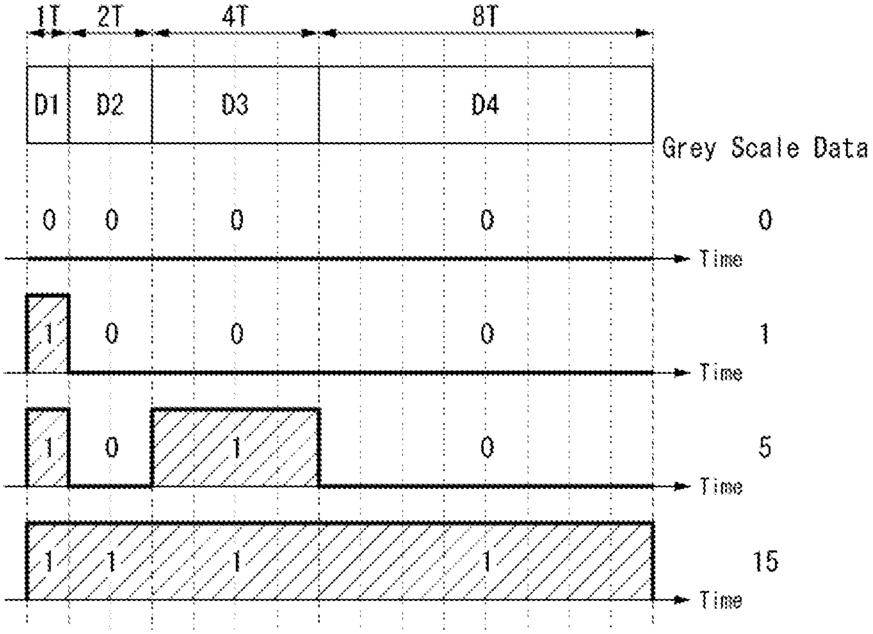
FIG. 2 shows an example of basic PWM waveforms for driving pixels.

FIG. 2 shows an example of basic PWM waveforms by a Binary Address Group (BAG) scheme. The BAG scheme is based on digital driving or PWM scheme. It only has a two-state signal (1 or 0) for driving pixels on a display device. Original grey scale data is converted into n-bit binary data, and then a PWM period is divided into n time sections. The length of each time section is not the same but the time length relationship from small to large is 1 T, 2 T, 4 T, 8 T, . . . The length of the last time section is 2^(n−1)*T. The order of time sections can be changed in any order. The only restriction is the total length of time sections should be (2^n−1)*T. In an example shown in FIG. 2, n=4 and time sections are arranged from small to large. The total energy or luminance of an LED is in proportion to the sum of the areas under the waveform (grey areas marked "1"). It can be seen that the LED can be driven only by changing states n times (n is 4 in FIG. 2) in one PWM period (for example, changing states at the beginning of 1 T, 2 T, 3 T, and 4 T), then we can get 2^n steps (16 steps in FIG. 2) of different energy or luminance can be obtained. The 2^n steps can be used for displaying grey scales and the bit depth of pixel data is n.

Since each time section above corresponds to one bit data, this time section is also referred to as "a data section" below, and in particular, since in most examples below, the data is binary data, this time section is also referred to as "a binary section", and the length of this time section is referred to as "a binary length".

In general, pixels are disposed in an array of p rows (p scan lines) and q columns (q data lines) on a display device. The pixel may include a thin film transistor (TFT) or a silicon substrate. The array may correspond to all or a part of the display device. All pixels need to be driven in one frame time. The value of q has no relation to the driving time sequences, and the driving time sequences are repeated for q columns, and thus q can be any number, and it can be just assumed to be one for easy to understand.

Figure 3:
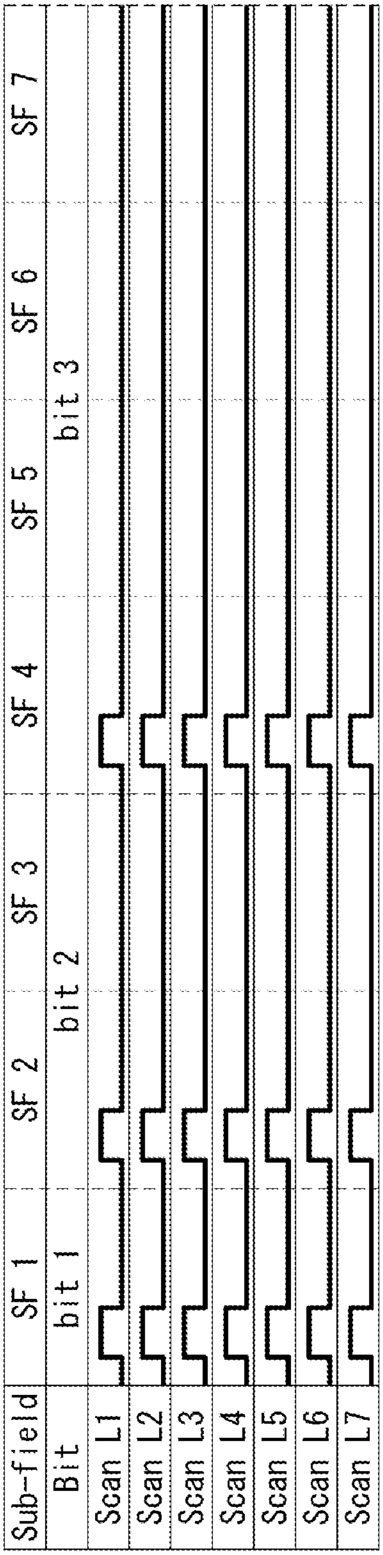
FIG. 3 shows an example of waveforms for driving pixels.

FIG. 3 shows an example of waveforms for driving 7 scan lines (7 pixels), and each pixel is driven with 3 bits (hereinafter, each waveform for driving a pixel is also referred to as "a driving sequence"). At the initial part of SF1 (sub-field 1), SF2, and SF4, a high signal means being turned ON, and a low signal means being turned OFF, namely, state changes are performed. First, each line is driven with bit1 (least significant bit (LSB)). After a time period 1 T, the same line is driven with bit 2. After a time period 2 T, the same line is driven with bit 3 (most significant bit (MSB)). After a time period 4 T, this time frame ends.

In this example, the number of bits for specifying a brightness, grey scale color, or illuminance is n=3, and the sum of the weights of bit1, bit2, and bit3 is 2^−1 is 7, so one frame time is divided into 7 sub-fields (SFs). However, no processing is performed in SF3, SF5, SF6 and SF7 for driving pixels, namely, a duration of time is not used efficiently. In this method, if the number of lines is p, p*(2^n−1) SFs are needed for driving data.

Figure 4:
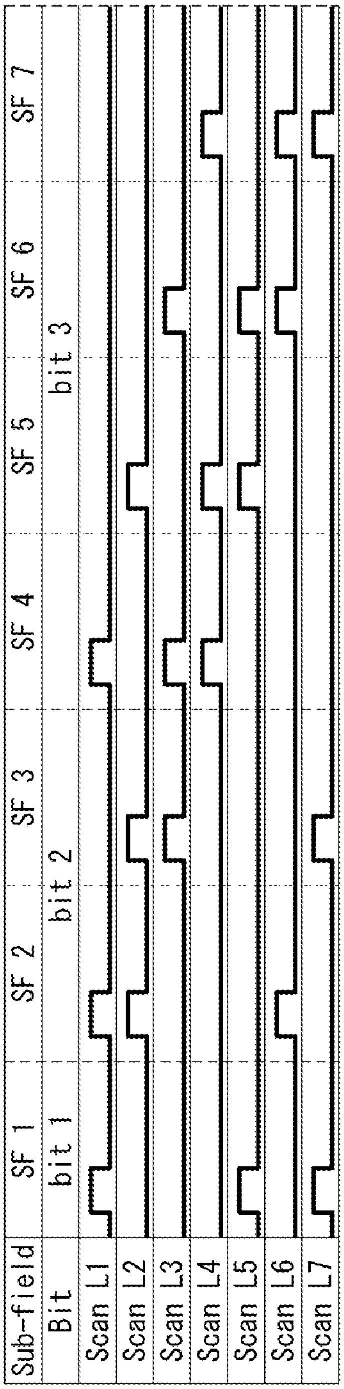
FIG. 4 shows another example of waveforms for driving pixels.

FIG. 4 shows another example of driving pixels in an efficient way. The pixel on the Scan L1 line is driven in SF1 for bit 1, SF2 for bit 2, and SF4 for bit 3. For the Scan L2 line, one SF is shifted compared to the Scan L1 line, and the pixel is driven in SF2 for bit 1, SF3 for bit 2, and SF5 for bit 3. For the Scan L3 line, one SF is shifted compared to the Scan L2 line, and the pixel is driven in SF3 for bit 1, SF4 for bit 2, and SF6 for bit 3. The same operations are repeated for the Scan L4 line to the Scan L7 line.

This kind of driving scheme is called "Binary Address Group (BAG)" driving. The characteristic of the BAG is that the number of small periods for driving pixel data is p*n, which is much smaller than p*(2^n−1) when n becomes larger such as 10, 12, or 14. Only 7*3=21 data driving periods are needed in the example of FIG. 4, while 7*7=49 data driving periods are needed in the example of FIG. 3, because the SFs with a turn-on signal cannot be simultaneously processed.

Figure 5:
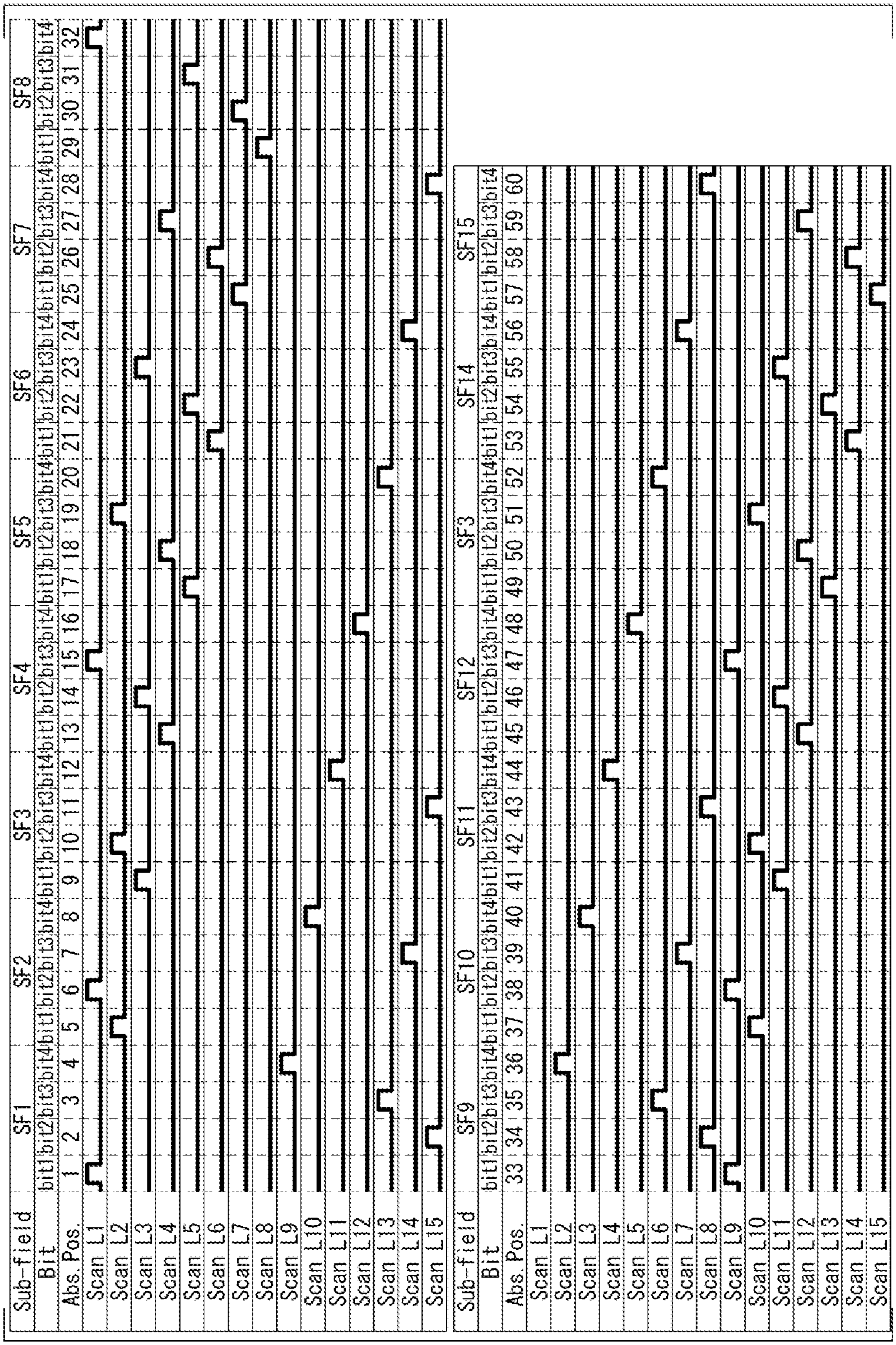
FIG. 5 shows another example of waveforms for driving pixels for 16 grey scales.

More efficient driving waveforms in one frame can be constructed based on the BAG scheme. It is assumed that the number of rows p is 15, and bit depth n is 4. FIG. 5 shows another example of waveforms for driving pixels for 16 grey scales or 16 linear steps from 0 to 15 for all pixels in 15 lines.

In FIG. 5, one frame time $T_{FRAME}$ is divided into 15 sub-field times $T_{SF}$ because n=4 and 2^n−1 is 15. Therefore, $T_{FRAME}$ equals 15*$T_{SF}$ in this example. Next, each SF is divided into 4 periods for each bit for a state change. This period is called "available data driving time" represented by $T_{DP}$, and $T_{DP}$ is a unit of time for constructing a driving sequence. Therefore, $T_{SF}$ equals 4*$T_{DP}$ in this example. In the BAG scheme, the binary length corresponding to each bit is mainly produced by combining SFs. If we set the starting time of the Scan L1 line to be located at SF1, and the order of the binary length is 1, 2, 4, and 8, bits 1, 2, 3 and 4 for state changes are located in SF1, SF2, SF4 and SF8, respectively.

As mentioned above, there are 15 $T_{SF}$ in one $T_{FRAME}$ and 4 $T_{DP}$ in one $T_{SF}$. Therefore, there are 60 $T_{DP}$ in one frame (or in one $T_{FRAME}$). 60 $T_{DP}$ are numbered from 1 to 60 and each position is called an absolute position (AbsPos) in one frame. In FIG. 5, for Scan L1 line, bit 1 is at AbsPos 1, bit 2 is at AbsPos 6, bit 3 is at AbsPos 15, and bit 4 is at AbsPos 32. For Scan L2 line, the starting point is located at first $T_{DP}$ of SF2 which is at AbsPos 5 in this frame. Bits 1, 2, 3, and 4 of Scan L2 line are located at AubPos 5, 10, 19, and 36. For Scan L3 line to Scan L15 line, bits 1, 2, 3, and 4 are located similarly. The periods for holding states for bits 1, 2, 3, and 4 are expected to be 1×, 2×, 4×, and 8× (multiples of 1, 2, 4, and 8, in other words, a sequence of powers of 2), respectively. However, the actual periods are 5*$T_{DP}$, 9*$T_{DP}$, 17*$T_{DP}$, and 29*$T_{DP}$, as shown in TABLE 1 below. It should be noted that for example, for Scan L1 line, 29*$T_{DP}$ comes from the time length between bit 4 of SF8 of the current frame and bit 1 of SF1 of the next frame. The series 5, 9, 17, and 29 do not comply with binary relationships 1×, 2×, 4× and 8× (in TABLE 1, the column "Multi" shows ratios of "Binary sec 1" to "Binary sec 4" and "Sum" to "Binary sec 1" as multiples of "Binary sec 1"). There exists errors in this solution. Therefore, serial binary sections are non-ideal.

TABLE 1

Binary Section Length by Basic BAG Scheme (Bit Depth = 4, Line = 15)

| Time Length | $T_{SF}$ + $T_{DP}$ | Value | Multi |
|---|---|---|---|
| Binary sec 1 = | $T_{SF}$* 1 + $T_{DP}$* 1 | = 5 | 1 |
| Binary sec 2 = | $T_{SF}$* 2 + $T_{DP}$* 1 | = 9 | 1.8 |
| Binary sec 3 = | $T_{SF}$* 4 + $T_{DP}$* 1 | = 17 | 3.4 |
| Binary sec 4 = | $T_{SF}$* 8 + $T_{DP}$* −3 | = 29 | 5.8 |
| Sum = | $T_{SF}$* 15 + $T_{DP}$* 0 | = 60 | 12 |

Figure 6:
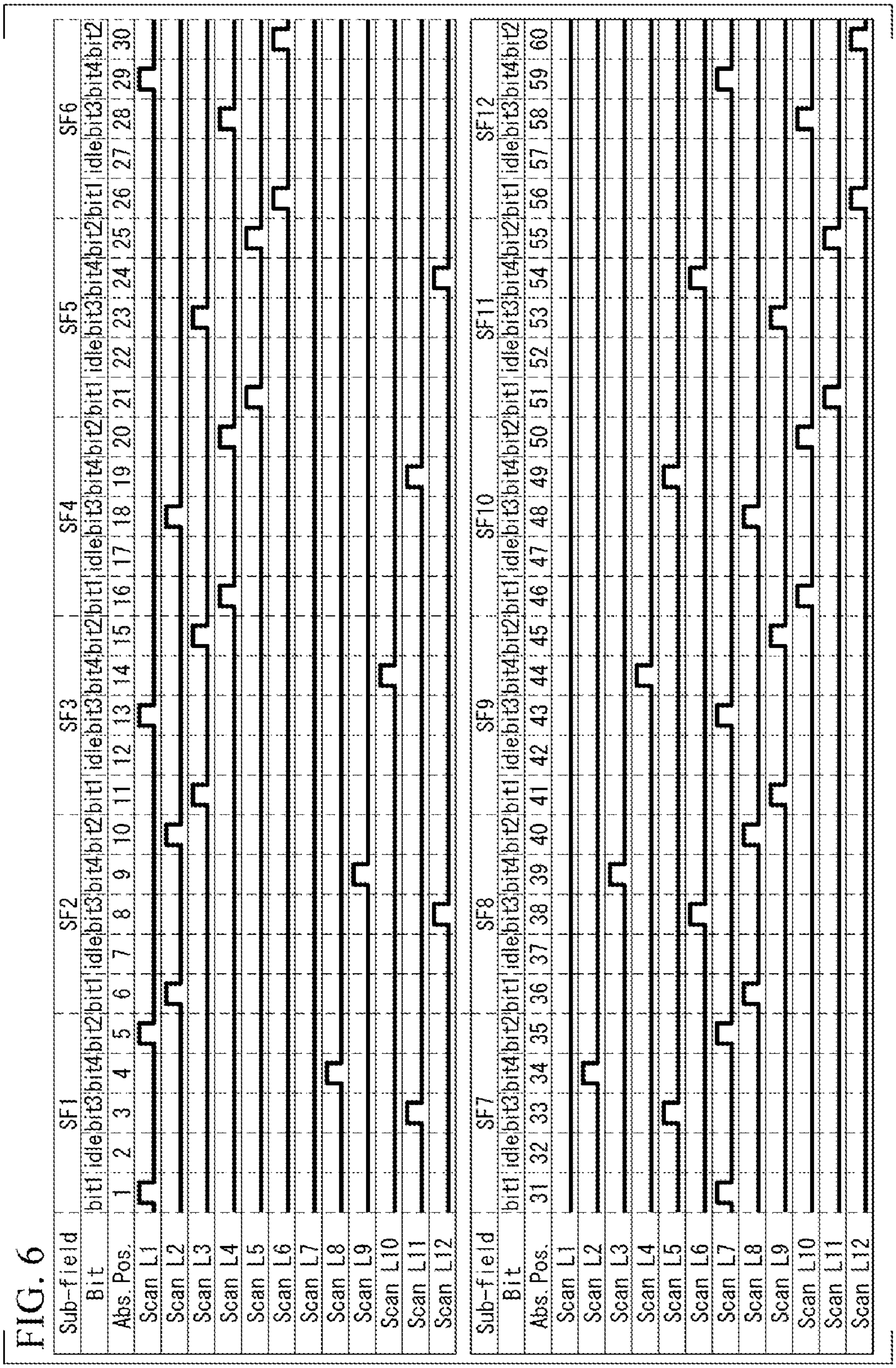
FIG. 6 shows an example of waveforms for driving pixels with ideal binary sections.

FIG. 6 shows an example of waveforms for driving pixels with ideal binary sections. In order to solve the above problem of non-ideal binary sections, the driving waveform is modified. In this example, bit depth n is 4, and the number of lines is 12. First, SFs are divided into 5 periods but not 4 periods. It means $T_{SF}$ equals 5*$T_{DP}$. The number of periods in one SF is defined as the number of cycles (CY). So, the CY is set to be n+1, which is bit depth+1. Second, a grey scale unit (GSU) is determined. GSU corresponds to the number of $T_{DP}$ corresponding to the minimum binary section. In this case, in order to construct a sequence of ideal binary sections, the total length of binary sections will be a multiple of 15, because 1+2+4+8=15. The number of lines is 12, and GSU is selected to be 4. Since the time length of GSU is 4*$T_{DP}$, the total length of binary sections is 4*15 which equals 60. Therefore, $T_{FRAME}$=60*$T_{DP}$. Since CY=5, each $T_{SF}$ equals 5*$T_{DP}$, there are 12 SFs in one frame, and thereby each SF can be a starting point of one line. Therefore, this is a solution with ideal binary sections for the case where n=4, and the number of lines=12.

Besides, there is one difference between the basic BAG scheme (FIG. 5) and the BAG scheme with ideal binary sections (FIG. 6). We can observe that all $T_{DP}$ in one SF are used for driving a pixel in FIG. 5. But there is one $T_{DP}$ which is not used for driving a pixel in FIG. 6. It is the second $T_{DP}$ position in every SF. The $T_{DP}$ without driving a pixel is an "idle" period in each SF. It is an unavoidable sacrifice in timing when trying to use the BAG scheme with ideal binary sections.

The $T_{DP}$ position in one SF is defined with a relative position (RelPos) so as to be easily described below. For each AbsPos, the relationship between AbsPos and RelPos is $$\text{AbsPos}=(k-1)\times CY+\text{RelPos} \quad (1)$$

where AbsPos belongs to the $k^{th}$ SF.

TABLE 2 shows line numbers to be turned ON for each sub-field and each RelPos in the waveforms in FIG. 6. It is easy to check when the waveform sequence becomes long and lines increase significantly. TABLE 3 shows binary section lengths by the BAG Scheme with ideal binary sections (bit depth=4, the number of lines=12).

TABLE 2

Line numbers to be turned ON by BAG Scheme with Ideal Binary Sections (Bit Depth = 4, Line = 12)

| | RelPos | | | | |
|---|---|---|---|---|---|
| | 1 | 2 | 3 | 4 | 5 |
| | | | Bit | | |
| | Bit 1 | Idle | Bit 3 | Bit 4 | Bit 2 |
| SF 1 | 1 | — | 11 | 8 | 1 |
| SF 2 | 2 | — | 12 | 9 | 2 |
| SF 3 | 3 | — | 1 | 10 | 3 |
| SF 4 | 4 | — | 2 | 11 | 4 |
| SF 5 | 5 | — | 3 | 12 | 5 |
| SF 6 | 6 | — | 4 | 1 | 6 |
| SF 7 | 7 | — | 5 | 2 | 7 |
| SF 8 | 8 | — | 6 | 3 | 8 |
| SF 9 | 9 | — | 7 | 4 | 9 |
| SF 10 | 10 | — | 8 | 5 | 10 |
| SF 11 | 11 | — | 9 | 6 | 11 |
| SF 12 | 12 | — | 10 | 7 | 12 |

TABLE 3

Binary Section Length by BAG Scheme with Ideal Binary Sections (Bit Depth = 4, Line = 12)

| Time Length | $T_{SF}$ + $T_{DP}$ | Value | Multi |
|---|---|---|---|
| Binary sec 1 = | $T_{SF}$* 1 + $T_{DP}$* −1 | = 4 | 1 |
| Binary sec 2 = | $T_{SF}$* 2 + $T_{DP}$* −2 | = 8 | 2 |
| Binary sec 3 = | $T_{SF}$* 4 + $T_{DP}$* −4 | = 16 | 4 |
| Binary sec 4 = | $T_{SF}$* 8 + $T_{DP}$* −8 | = 32 | 8 |
| Sum = | $T_{SF}$* 15 + $T_{DP}$* −15 | = 60 | 15 |

The waveforms for driving pixels in FIG. 6 show ideal binary sections, in which brightness relationship is correct for a display device with p rows. However, the main problem is that the available data driving time $T_{DP}$ is short and it is hard to complete the whole driving action. Also, in some cases, the ideal binary sections cannot use a duration of time in a most optimized way.

For further discussion, this BAG scheme is summarized with mathematical equations:

$$SF \times CY = GSU \times DSW\_sum \quad (2)$$

DSW_sum means "data section weight sum" that is the sum of the weight of all data sections (binary sections). For example, if n=4, the sum of the weight of all binary sections is 1+2+4+8=15. All BAG solutions need to satisfy equation (2) and the following equation (3):

$$T_{FRAME} = T_{DP} \times SF \times CY \quad (3)$$

$T_{DP}$ is the time period for driving pixels of each line, because $T_{FRAME}$ is fixed once the frame rate is determined. CY depends on bit depth n. If $T_{DP}$ needs to be increased for driving, the number of SFs needs to be decreased. However, as can be seen from the example in FIG. 6, the number of SFs cannot be lower than the number of lines, because each line should be driven once in one frame. Therefore, the principle to find a BAG solution is to find the minimum GSU that satisfies equation (2) and following equation (4):

$$SF \geq \text{the number of lines} \quad (4)$$

Using a large number of bits, it is assumed that bit depth n=12, and the number of lines=630. Then, CY should be n+1 which is 13 and DSW_sum is 1+2+4+ . . . +1024+ 2048=4095. According to equation (4), the minimum GSU should be 2 and the number of SFs becomes 2×4095/13=630, which satisfies SF≥the number of lines.

$T_{DP}$ can be derived from equations (2) and (3) as follows:

$$T_{DP} = \frac{T_{SF}}{CY} = \frac{T_{FRAME}}{CY \times \text{SF\_number}} = \frac{T_{FRAME}}{GSU \times \text{DSW\_sum}} \quad (5)$$

According to equation (5) with CY=13 and SF_number=630, $T_{DP}$ is calculated as ($T_{FRAME}$/630/13)=($T_{FRAME}$/8190). Assuming that frame rate=60 Hz, $T_{FRAME}$=1/60 s. Then, $T_{DP}$ is 2.035 us. In some worse cases, it might be insufficient to drive pixels. Thus, it needs to find ways to provide a longer $T_{DP}$ and correct grey scales for each pixel.

Figure 7:
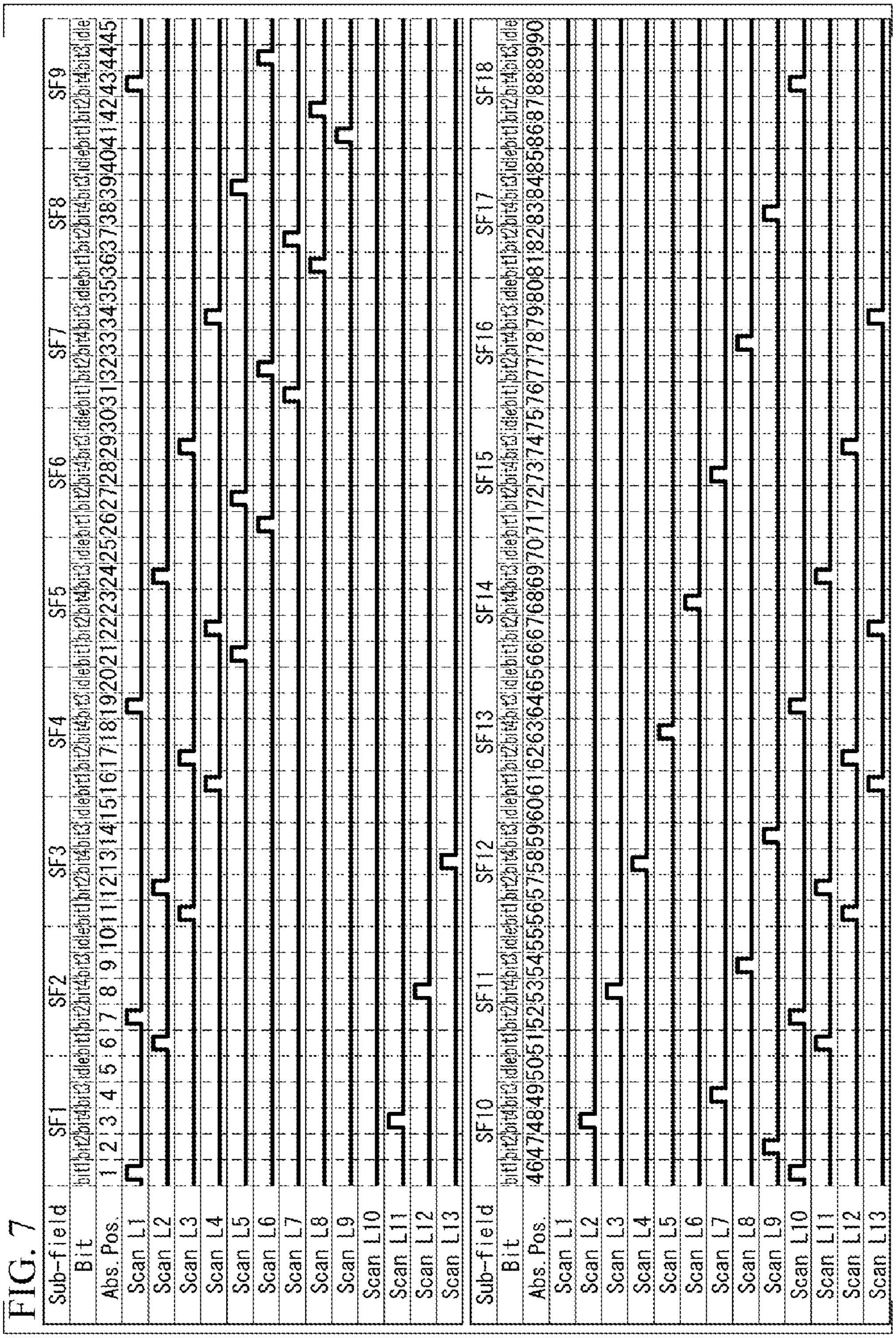
FIG. 7 shows an example of waveforms for bit depth n=4 and the number of lines p=13.

FIG. 7 shows an example of waveforms for bit depth n=4 and the number of lines p=13. In FIG. 6, the number of lines is 12, GSU is 4, and there are only 12 SFs which can be starting points for 12 lines in FIG. 6. Since the number of lines is 13 in this case, the same GSU is not used. In this kind of BAG scheme, it is necessary that the number of SFs is larger than the number of lines. Otherwise, it cannot drive pixels in all lines successfully.

GSU=6 is selected in this case. The time length of GSU is 6*$T_{DP}$. Then, the total length of binary sections is 6*15 that equals 90. Therefore, $T_{FRAME}$=90*$T_{DP}$ in this case. Because CY=5, each $T_{SF}$ equals 5*$T_{DP}$, there are 18 SFs in one frame, and each SF can be a starting point of one line. Therefore, it is a solution for driving pixels with ideal binary sections for the case of n=4 and the number of lines=13. For this kind of solution, it always needs to find the minimum SF and the number of SFs should be larger than or equal to the number of lines. The waveforms of this solution is shown in FIG. 7.

The $T_{DP}$ in FIG. 6 is ($T_{FRAME}$/60) and $T_{DP}$ in FIG. 7 is ($T_{FRAME}$/90). As bit depth and the number of lines become larger, the $T_{DP}$ becomes shorter and it is not enough to drive pixels correctly.

TABLE 4 shows line numbers to be turned ON for each sub-field and each RelPos in the waveforms in FIG. 7. TABLE 5 shows binary section length by BAG Scheme with ideal binary sections (bit depth=4, the number of lines=13).

TABLE 4

Line numbers to be turned ON by BAG Scheme with Ideal Binary Sections (Bit Depth = 4, Line = 13)

| | RelPos | | | | |
|---|---|---|---|---|---|
| | 1 | 2 | 3 | 4 | 5 |
| | Bit | | | | |
| | Bit 1 | Bit 2 | Bit 4 | Bit 3 | Idle |
| SF 1 | 1 | — | 11 | — | — |
| SF 2 | 2 | 1 | 12 | — | — |
| SF 3 | 3 | 2 | 13 | — | — |
| SF 4 | 4 | 3 | — | 1 | — |
| SF 5 | 5 | 4 | — | 2 | — |
| SF 6 | 6 | 5 | — | 3 | — |
| SF 7 | 7 | 6 | — | 4 | — |
| SF 8 | 8 | 7 | — | 5 | — |
| SF 9 | 9 | 8 | 1 | 6 | — |
| SF 10 | 10 | 9 | 2 | 7 | — |
| SF 11 | 11 | 10 | 3 | 8 | — |
| SF 12 | 12 | 11 | 4 | 9 | — |
| SF 13 | 13 | 12 | 5 | 10 | — |
| SF 14 | — | 13 | 6 | 11 | — |
| SF 15 | — | — | 7 | 12 | — |
| SF 16 | — | — | 8 | 13 | — |
| SF 17 | — | — | 9 | — | — |
| SF 18 | — | — | 10 | — | — |

TABLE 5

Binary Section Length by BAG Scheme with Ideal Binary Sections (Bit Depth = 4, Line = 13)

| Time Length | $T_{SF} + T_{DP}$ | Value | Multi |
|---|---|---|---|
| Binary sec 1 = | $T_{SF}$* 1 + $T_{DP}$* 1 | = 6 | 1 |
| Binary sec 2 = | $T_{SF}$* 2 + $T_{DP}$* 2 | = 12 | 2 |
| Binary sec 3 = | $T_{SF}$* 4 + $T_{DP}$* 4 | = 24 | 4 |
| Binary sec 4 = | $T_{SF}$* 8 + $T_{DP}$* 8 | = 48 | 8 |
| Sum = | $T_{SF}$* 15 + $T_{DP}$* 15 | = 90 | 15 |

In the case of FIG. 6 and FIG. 7, the available data driving time ($T_{DP}$) is possibly not enough to drive pixels successfully, and when the number of lines increases from 12 to 13, the number of SFs increases from 12 to 18. Because there exists no solution with the numbers of SFs 13, 14, . . . , 17, the numbers of SFs with ideal binary sections are not consecutive. It is waste of a duration of time in one frame, and thus have room for improvement on timing of the driving sequence.

The following describes "Blank Sub-field" driving sequences. Mainly, the idea is to add an off-section after binary sections in a driving sequence. The off-section can be extended. As the off-section extends, the number of SFs in one frame increases. An appropriate time length of an off-section is selected so that the number of SFs equals the number of lines, thereby the number of SFs is enough to drive all lines, and a duration of time is efficiently used than the BAG scheme. The $T_{DP}$ of this Blank Sub-field scheme can be longer than the BAG scheme, and binary sections still comply with binary relationship.

Figure 8:
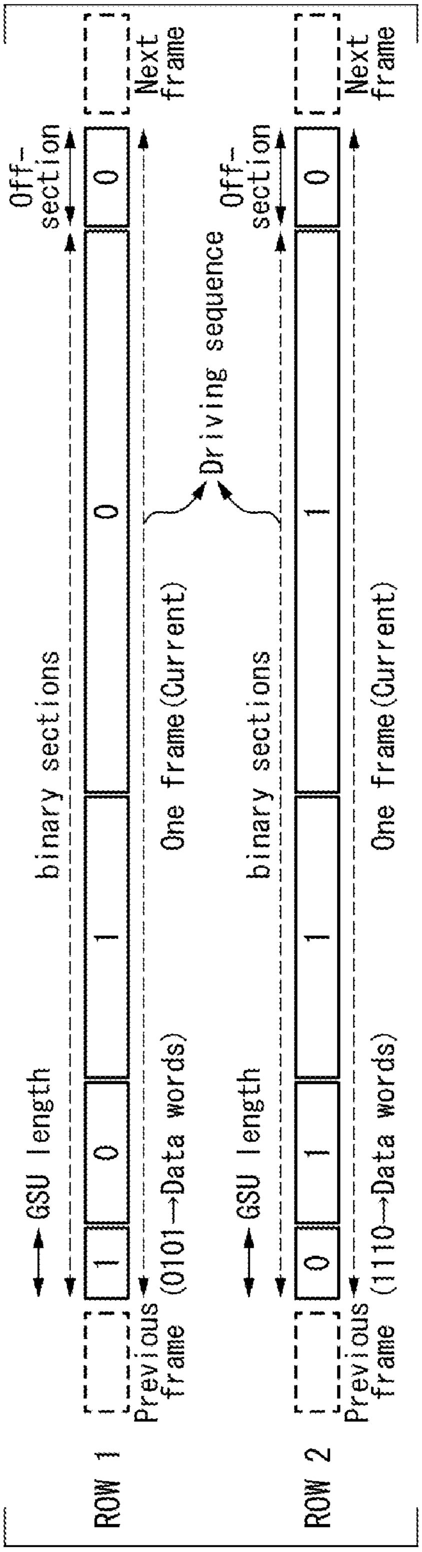
FIG. 8 shows a basic idea of a Blank Sub-field driving sequence.

FIG. 8 shows a basic idea of the Blank Sub-field driving sequence. It shows driving sequences of two rows (or two lines). In this example, bit depth n=4. In a conventional BAG scheme idea, there are only 4 binary sections in a driving sequence because n is 4. All 4 binary sections are for driving a pixel with data defined by a user. If the data words of row 1 is 0101 in binary code, the 4 binary sections drive the pixel in row 1 with a voltage signal related to 0101. Assuming that voltage $V_{CC}$ represents '1' and voltage $V_{SS}$ represents '0', the 4 binary sections drive row 1 with $V_{CC}$, $V_{SS}$, $V_{CC}$, $V_{SS}$ in order. It should be noted that the first $V_{CC}$ is LSB, and last $V_{SS}$ is MSB. For row 2, the data words of row 2 is 1110, and the 4 binary sections drive row 1 with $V_{SS}$, $V_{CC}$, $V_{CC}$, $V_{CC}$ in order.

In the Blank Sub-field driving sequence, an extra section is added. In FIG. 8, the extra section is an off-section and put after binary sections. The off-section always drives the pixel with '0' which has no relationship with data words of that pixel. Because this off-section drives the pixel with '0' of an OFF signal, it does not change the grey scale by previous 4 binary sections in display devices such as micro-LED, OLED, or any materials that can be driven by PWM control.

Row 1 is driven with $V_{CC}$, $V_{SS}$, $V_{CC}$, $V_{SS}$, and $V_{SS}$. Row 2 is driven with $V_{SS}$, $V_{CC}$, $V_{CC}$, $V_{CC}$, and $V_{SS}$. In row 2, the value of $V_{CC}$ can be a larger or smaller $V_{SS}$. Also $V_{CC}$ and $V_{SS}$ are not restricted to a positive or negative voltage. In the case where a P-channel TFT is driven, the value of OFF voltage $V_{SS}$ might be larger than $V_{CC}$.

When constructing waveform arrangements for a display device with the Blank Sub-field scheme, there are two cases in which a driving sequence of binary sections is recursive and non-recursive. In the recursive case, one more action needs to be taken before adding an off-section to the driving sequence.

Figure 9:
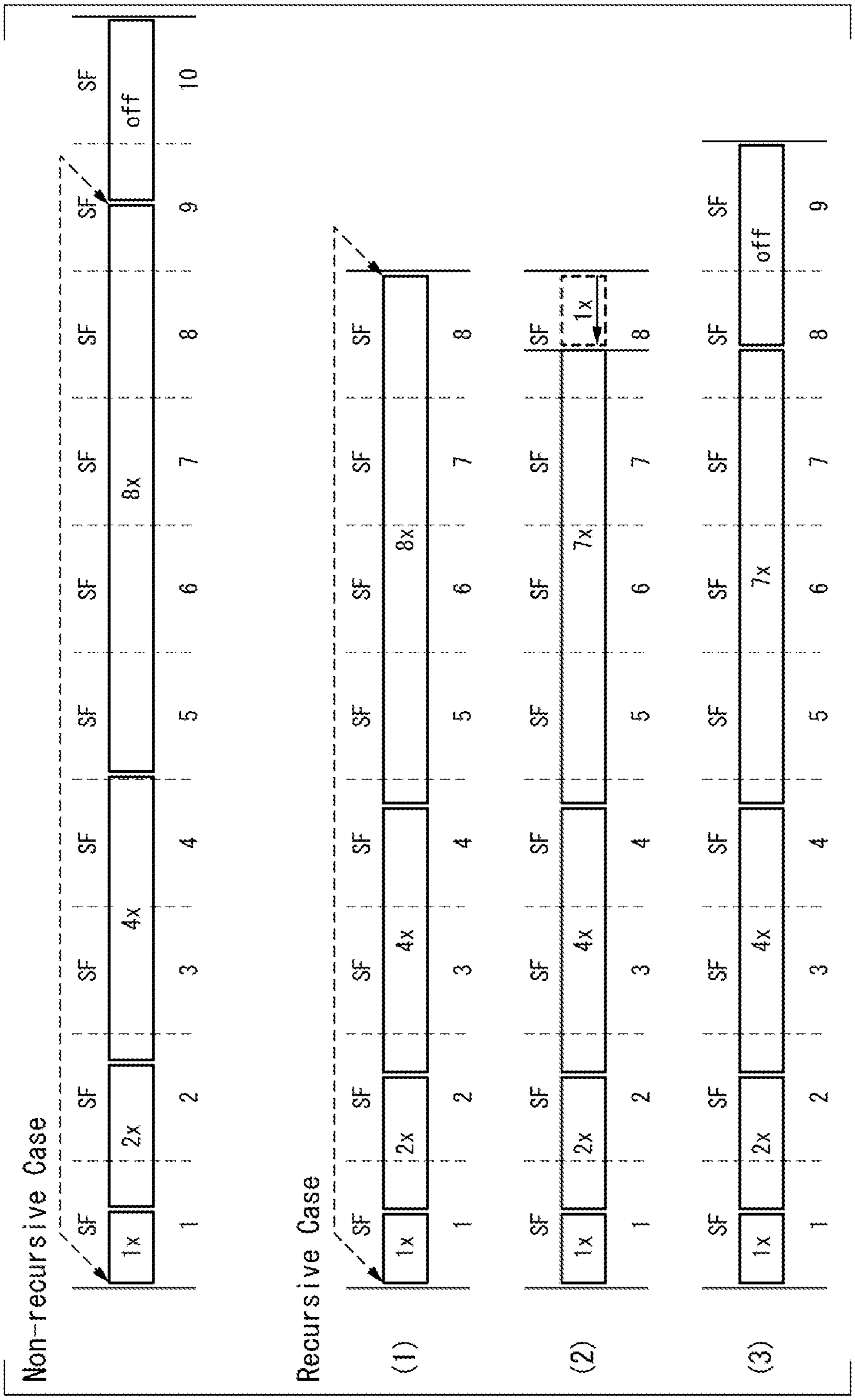
FIG. 9 shows a non-recursive driving sequence and a recursive driving sequence.

FIG. 9 shows how to arrange binary sections and an off-section in one frame. The recursive case is defined as the case where the total length of binary sections of a driving sequence is a multiple of CY. If the total length of binary sections of a driving sequence is not a multiple of CY, it is a non-recursive case. In the lower part of FIG. 9, in the driving sequence of the recursive case, the RelPos of a starting point of the binary sections and the RelPos of the position right next to the end of binary sections are the same. This is because the length of binary sections in the driving sequence is divisible by CY, which CY is the number of units of time ($T_{DP}$) in one SF. The starting point of the next driving sequence is at the same RelPos, as shown by dotted arrows in (1) of Recursive Case. Hence, it is called a recursive case. On the other hand, in the upper part of FIG. 9, if the length of binary sections in the driving sequence is not divisible by CY, as shown by dotted arrows, it is a non-recursive case.

In the non-recursive case, it is only required to add an off-section after binary sections, and extend the off-section to enough length. Usually, the off-section is extended so that the number of SFs becomes the same as the number of lines. Then, the timing efficiency will be at its highest.

In the recursive case, an extra action is needed. The binary section corresponding to the MSB is reduced by the length of one unit of length. This unit of length is usually a GSU. The detail steps are shown in the lower part of FIG. 9. It is a simple case of n=4. (1) judges that the driving sequence is recursive, (2) cuts one GSU from the binary section corresponding to the MSB, and makes the driving sequence non-recursive, and (3) adds an off-section after binary sections, and extends the off-section to enough length.

An example of a driving sequence for a display device is shown below.

Figure 10:
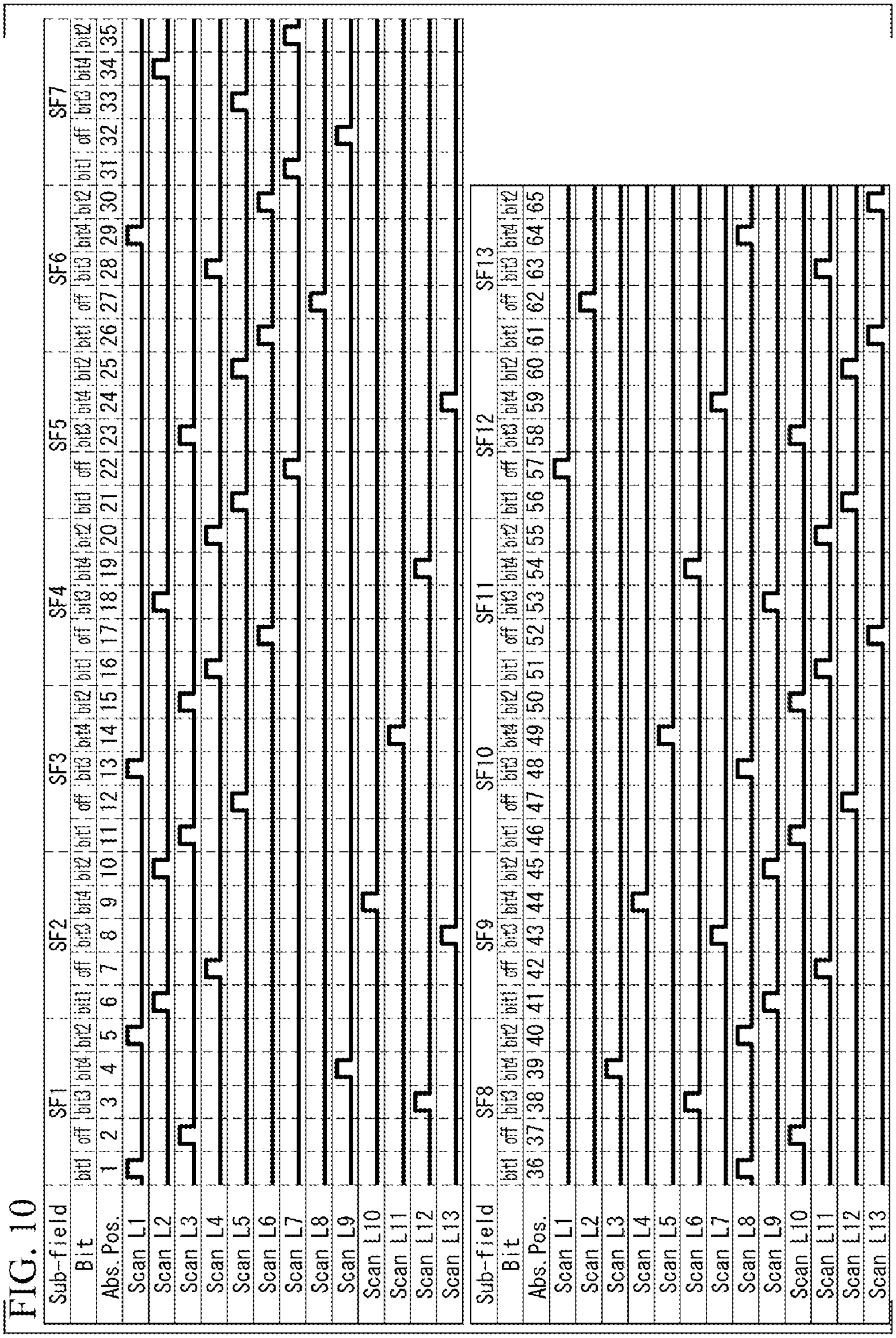
FIG. 10 shows an example of waveforms for driving pixels in which bit depth n is 4 and the number of lines p is 13.

FIG. 10 shows an example of waveforms for driving pixels in which bit depth n is 4 and the number of lines p is 13. This condition is the same as the example of FIG. 7. These two examples can be compared to find out differences.

First, the GSU is set to 4. The length of binary sections are 4, 8, 16, 32. The sum of binary sections is 60. We can calculate that the sequence starts from when AbsPos is 1, and its RelPos is 1. The AbsPos of the position right next to the end of binary sections is 61, and its RelPos is 1, too. The value 61 is calculated from 1+60. Because the two RelPos are the same, this is a recursive case.

Second, the binary sections are made to be non-recursive. The binary section corresponding to the MSB is calculated by multiplying GSU and the weight corresponding to the MSB that is 8. Instead of subtracting GSU from the length of the binary section corresponding to the MSB, the length of the non-recursive binary sections can be calculated as follows: subtracting 1 from 8 becomes 7 and multiplying 7 by GSU becomes 28. After that, the RelPos of the position right next to the end of the binary sections is 2.

Third, an off-section is added after the binary sections. Because the number of lines is 13, the off-section is extended to the length of $9{*}T_{DP}$. The number of SFs becomes 13 and is perfectly suitable for driving 13 lines.

Comparing waveforms of FIG. 7 and FIG. 10, it can be seen that only 13 SFs are needed in the Blank Sub-field scheme, but 18 SFs are needed in the "BAG Scheme". The $T_{DP}$ for driving a pixel is enlarged by 18/13 because $T_{DP}$ is ($T_{FRAME}$/90) in FIG. 7 and $T_{DP}$ is ($T_{FRAME}$/65) in FIG. 10.

TABLE 6 shows line numbers to be turned ON by the Blank Sub-field scheme (bit depth=4, the number of lines=13). TABLE 7 shows binary section length by the Blank Sub-field scheme (bit depth=4, the number of lines=13).

TABLE 6

Line numbers to be turned ON by Blank Sub-field scheme (Bit Depth = 4, Line = 13)

| | RelPos 1 | RelPos 2 | RelPos 3 | RelPos 4 | RelPos 5 |
|---|---|---|---|---|---|
| Bit | Bit 1 | Off | Bit 3 | Bit 4 | Bit 2 |
| SF 1 | 1 | 3 | 12 | 9 | 1 |
| SF 2 | 2 | 4 | 13 | 10 | 2 |
| SF 3 | 3 | 5 | 1 | 11 | 3 |
| SF 4 | 4 | 6 | 2 | 12 | 4 |
| SF 5 | 5 | 7 | 3 | 13 | 5 |
| SF 6 | 6 | 8 | 4 | 1 | 6 |
| SF 7 | 7 | 9 | 5 | 2 | 7 |
| SF 8 | 8 | 10 | 6 | 3 | 8 |
| SF 9 | 9 | 11 | 7 | 4 | 9 |
| SF 10 | 10 | 12 | 8 | 5 | 10 |
| SF 11 | 11 | 13 | 9 | 6 | 11 |
| SF 12 | 12 | 1 | 10 | 7 | 12 |
| SF 13 | 13 | 2 | 11 | 8 | 13 |

TABLE 7

Binary Section Length by Blank Sub-field scheme (Bit Depth = 4, Line = 13)

| Time Length | $T_{SF} + T_{DP}$ | Value | Multi |
|---|---|---|---|
| Binary sec 1 = | $T_{SF}$* 1 + $T_{DP}$* −1 | = 4 | 1 |
| Binary sec 2 = | $T_{SF}$* 2 + $T_{DP}$* −2 | = 8 | 2 |
| Binary sec 3 = | $T_{SF}$* 4 + $T_{DP}$* −4 | = 16 | 4 |
| Binary sec 4 = | $T_{SF}$* 8 + $T_{DP}$* −12 | = 28 | 7 |
| Off sec = | $T_{SF}$* 1 + $T_{DP}$* 4 | = 9 | — |
| Sum = | $T_{SF}$* 16 + $T_{DP}$* −15 | = 65 | 14 |

Figure 11:
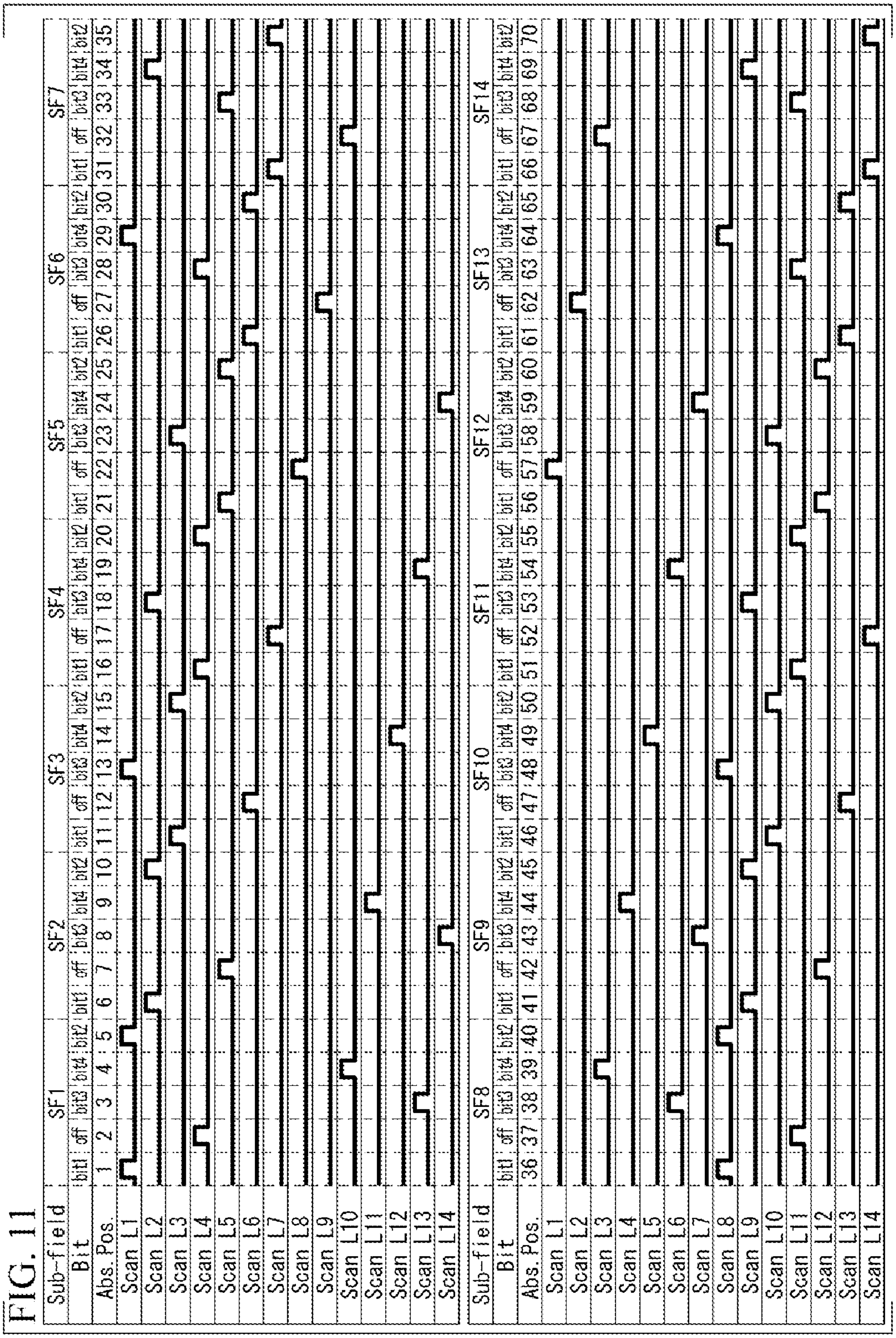
FIG. 11 shows another example of waveforms by the Blank Sub-field scheme.

FIG. 11 shows another example of waveforms by the Blank Sub-field scheme. In this example, bit depth is 4 and the number of lines is 14 (CY=5, SF_number=14, DSW_sum=15, and Off_section=14). The number of lines is larger than the example in FIG. 10 by one. By the Blank Sub-field scheme, the number of SFs can be adjusted to fit with the number of lines, and then it is possible to get larger available data driving time ($T_{DP}$) than the conventional BAG scheme.

TABLE 8 shows line numbers to be turned ON by the Blank Sub-field scheme (bit depth=4, the number of lines=14). TABLE 9 shows binary section lengths by the Blank Sub-field scheme (bit depth=4, the number of lines=14).

TABLE 8

Line numbers to be turned ON by Blank Sub-field scheme (Bit Depth = 4, Line = 14)

| | RelPos 1 | RelPos 2 | RelPos 3 | RelPos 4 | RelPos 5 |
|---|---|---|---|---|---|
| Bit | Bit 1 | Off | Bit 3 | Bit 4 | Bit 2 |
| SF 1 | 1 | 4 | 13 | 10 | 1 |
| SF 2 | 2 | 5 | 14 | 11 | 2 |
| SF 3 | 3 | 6 | 1 | 12 | 3 |
| SF 4 | 4 | 7 | 2 | 13 | 4 |
| SF 5 | 5 | 8 | 3 | 14 | 5 |
| SF 6 | 6 | 9 | 4 | 1 | 6 |
| SF 7 | 7 | 10 | 5 | 2 | 7 |
| SF 8 | 8 | 11 | 6 | 3 | 8 |
| SF 9 | 9 | 12 | 7 | 4 | 9 |
| SF 10 | 10 | 13 | 8 | 5 | 10 |
| SF 11 | 11 | 14 | 9 | 6 | 11 |
| SF 12 | 12 | 1 | 10 | 7 | 12 |
| SF 13 | 13 | 2 | 11 | 8 | 13 |
| SF 14 | 14 | 3 | 12 | 9 | 14 |

TABLE 9

Binary Section Length by Blank Sub-field scheme (Bit Depth = 4, Line = 14)

| Time Length | $T_{SF} + T_{DP}$ | Value | Multi |
|---|---|---|---|
| Binary sec 1 = | $T_{SF}$* 1 + $T_{DP}$* −1 | = 4 | 1 |
| Binary sec 2 = | $T_{SF}$* 2 + $T_{DP}$* −2 | = 8 | 2 |
| Binary sec 3 = | $T_{SF}$* 4 + $T_{DP}$* −4 | = 16 | 4 |
| Binary sec 4 = | $T_{SF}$* 8 + $T_{DP}$* −12 | = 28 | 7 |
| Off sec = | $T_{SF}$* 2 + $T_{DP}$* −4 | = 14 | — |
| Sum = | $T_{SF}$* 17 + $T_{DP}$* −15 | = 70 | 14 |

TABLE 10 shows another example of the Blank Sub-field driving. In this example, bit depth is 10 and the number of lines is 960. This condition is closer to an actual display device. As the bit depth and the number of lines increase, it is too difficult to show complete waveforms for driving pixels. So, the waveforms are not shown in a figure, and only line numbers to be turned ON are shown in TABLE 10. This table shows which line is turned ON at each $T_{DP}$. Each value in table shows which line is turned ON at the $T_{DP}$ position. The $T_{DP}$ position is at a certain RelPos in a certain SF. The relationship between the waveforms and the table is the same as FIG. 10 and TABLE 6, and FIG. 11 and TABLE 8.

In TABLE 10, 10 is selected as GSU. Because n=10, the sum of the weight of binary sections (DSW_sum)=1+2+4+ . . . +256+512=1023, so the length of the binary sections is 10*1023=10,230. This is a recursive case and the length of the binary section needs to be modified to 1023-1=1022. Thus, the corrected length of the binary section is 10*1022=10,220. For n=10, CY is set to be 11. For the Blank Sub-field scheme, the number of SFs is set to be the same as the number of SFs to get best time use efficiency. So, the number of SF is 960. Total number of $T_{DP}$ in one frame is 960*11=10,560. If the frame rate of this display device is 60 Hz, we can obtain the available data driving time $T_{DP}$ of 1/60/10560=1.578 us. The equation for calculating $T_{DP}$ for Blank Sub-field scheme is:

$$T_{DP} = \frac{T_{SF}}{CY} = \frac{T_{FRAME}}{CY \times \text{SF\_number}} = \frac{T_{FRAME}}{GSU \times (\text{DSW\_sum} - 1) + (\text{Off\_section})} \tag{6}$$

$$\text{Off\_section} = GSU + \text{BSF\_number} \times CY \tag{7}$$

The length of the off-section is GSU plus a multiple of CY and the number of $T_{DP}$ included in Blank Sub-field (BSF) ("BSF_number" in equation (7)). Finally, the length of binary sections is 10,220; the length of the off-section is 10,560-10,220=340. In this way, GSU and Off_section (the length of the off-section) are selected so that the following equation is satisfied: CY×SF_number=GSU×(DSW_sum−1)+Off_section, where SF_number is the number of SFs in one frame. In complete waveforms in TABLE 10, the starting point of Scan L1 line in one frame is set to AbsPos=1. The order of binary sections is set as following series: 1×, 2×, 4×, 8×, . . . , 256×, 511×, off-section.

TABLE 10

Line numbers to be turned ON by Blank Sub-field scheme (Bit Depth = 10, Line = 960)

| | RelPos 1 | RelPos 2 | RelPos 3 | RelPos 4 | RelPos 5 | RelPos 6 | RelPos 7 | RelPos 8 | RelPos 9 | RelPos 10 | RelPos 11 |
|---|---|---|---|---|---|---|---|---|---|---|---|
| Bit | Bit1 | Off | Bit6 | Bit7 | Bit4 | Bit8 | Bit10 | Bit5 | Bit3 | Bit9 | Bit2 |
| SF 1 | 1 | 32 | 933 | 904 | 955 | 846 | 497 | 948 | 959 | 730 | 1 |
| SF 2 | 2 | 33 | 934 | 905 | 956 | 847 | 498 | 949 | 960 | 731 | 2 |
| SF 3 | 3 | 34 | 935 | 906 | 957 | 848 | 499 | 950 | 1 | 732 | 3 |
| SF 4 | 4 | 35 | 936 | 907 | 958 | 849 | 500 | 951 | 2 | 733 | 4 |

TABLE 10-continued

Line numbers to be turned ON by Blank Sub-field scheme (Bit Depth = 10, Line = 960)

| RelPos | 1 | 2 | 3 | 4 | 5 | 6 | 7 | 8 | 9 | 10 | 11 |
|---|---|---|---|---|---|---|---|---|---|---|---|
| Bit | Bit1 | Off | Bit6 | Bit7 | Bit4 | Bit8 | Bit10 | Bit5 | Bit3 | Bit9 | Bit2 |
| SF 5 | 5 | 36 | 937 | 908 | 959 | 850 | 501 | 952 | 3 | 734 | 5 |
| . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . |
| SF 478 | 478 | 509 | 450 | 421 | 472 | 363 | 14 | 465 | 476 | 247 | 478 |
| SF 479 | 479 | 510 | 451 | 422 | 473 | 364 | 15 | 466 | 477 | 248 | 479 |
| SF 480 | 480 | 511 | 452 | 423 | 474 | 365 | 16 | 467 | 478 | 249 | 480 |
| SF 481 | 481 | 512 | 453 | 424 | 475 | 366 | 17 | 468 | 479 | 250 | 481 |
| SF 482 | 482 | 513 | 454 | 425 | 476 | 367 | 18 | 469 | 480 | 251 | 482 |
| . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . |
| SF 956 | 956 | 27 | 928 | 899 | 950 | 841 | 492 | 943 | 954 | 725 | 956 |
| SF 957 | 957 | 28 | 929 | 900 | 951 | 842 | 493 | 944 | 955 | 726 | 957 |
| SF 958 | 958 | 29 | 930 | 901 | 952 | 843 | 494 | 945 | 956 | 727 | 958 |
| SF 959 | 959 | 30 | 931 | 902 | 953 | 844 | 495 | 946 | 957 | 728 | 959 |
| SF 960 | 960 | 31 | 932 | 903 | 954 | 845 | 496 | 947 | 958 | 729 | 960 |

TABLE 11 shows an example in which bit depth is 12 and the number of lines is 960. The bit depth increases by 2 bits and the same number of lines is kept compared to the example in TABLE 10. In this case, 3 is selected as GSU. Because n=12, 1+2+4+ . . . +1024+2048=4095, so the length of binary sections is 3*4095=12,285. This is a recursive case and the length of the binary section needs to be modified to 4095-1=4094. Thus, the corrected length of the binary section is 3*4094=12,282. For n=12, CY is set to be 13. For the Blank Sub-field driving, the number of SFs is set to be the same as the number of lines to get best time use efficiency. So, the number of SFs is 960. Total number of $T_{DP}$ in one frame is 960*13=12,480. If the frame rate of this display device is 60 Hz, the available data driving time $T_{DP}$ is 1/60/12560=1.335 us.

The length of the off-section is GSU plus a multiple of CY and the number of BSF (Blank Sub-field). Finally, the length of the binary sections is 12,282, and the length of the off-section is 12,480−12,282=198. In complete waveforms in TABLE 11, the starting point of Scan L1 line in one frame is set at AbsPos=1. The order of binary sections is set as following series: 1×, 2×, 4×, 8×, . . . , 1024×, 2047×, off-section.

TABLE 11

Line numbers to be turned ON by Blank Sub-field scheme (Bit Depth = 12, Line-960)

| RelPos | 1 | 2 | 3 | 4 | 5 | 6 | 7 | 8 | 9 | 10 | 11 | 12 | 13 |
|---|---|---|---|---|---|---|---|---|---|---|---|---|---|
| Bit | Bit1 | Bit11 | Bit6 | Bit2 | Bit8 | Bit12 | Bit5 | Bit7 | Bit4 | Bit3 | Off | Bit9 | Bit10 |
| SF 1 | 1 | 725 | 954 | 1 | 932 | 489 | 958 | 947 | 960 | 1 | 17 | 903 | 844 |
| SF 2 | 2 | 726 | 955 | 2 | 933 | 490 | 959 | 948 | 1 | 2 | 18 | 904 | 845 |
| SF 3 | 3 | 727 | 956 | 3 | 934 | 491 | 960 | 949 | 2 | 3 | 19 | 905 | 846 |
| SF 4 | 4 | 728 | 957 | 4 | 935 | 492 | 1 | 950 | 3 | 4 | 20 | 906 | 847 |
| SF 5 | 5 | 729 | 958 | 5 | 936 | 493 | 2 | 951 | 4 | 5 | 21 | 907 | 848 |
| . . . | . . . | . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . | . . . | . . . |
| SF 478 | 478 | 242 | 471 | 478 | 449 | 6 | 475 | 464 | 477 | 478 | 494 | 420 | 361 |
| SF 479 | 479 | 243 | 472 | 479 | 450 | 7 | 476 | 465 | 478 | 479 | 495 | 421 | 362 |
| SF 480 | 480 | 244 | 473 | 480 | 451 | 8 | 477 | 466 | 479 | 480 | 496 | 422 | 363 |
| SF 481 | 481 | 245 | 474 | 481 | 452 | 9 | 478 | 467 | 480 | 481 | 497 | 423 | 364 |
| SF 482 | 482 | 246 | 475 | 482 | 453 | 10 | 479 | 468 | 481 | 482 | 498 | 424 | 365 |
| . . . | . . . | . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . | . . . | . . . |
| . . . | . . . | . . . | . . . | . . . | . . . | . . . | . . . | . . . | . . . | . . . | . . . | . . . | . . . |
| SF 956 | 956 | 720 | 949 | 956 | 927 | 484 | 953 | 942 | 955 | 956 | 12 | 898 | 839 |
| SF 957 | 957 | 721 | 950 | 957 | 928 | 485 | 954 | 943 | 956 | 957 | 13 | 899 | 840 |
| SF 958 | 958 | 722 | 951 | 958 | 929 | 486 | 955 | 944 | 957 | 958 | 14 | 900 | 841 |
| SF 959 | 959 | 723 | 952 | 959 | 930 | 487 | 956 | 945 | 958 | 959 | 15 | 901 | 842 |
| SF 960 | 960 | 724 | 953 | 960 | 931 | 488 | 957 | 946 | 959 | 960 | 16 | 902 | 843 |

As application scenarios, the embodiments of the present invention can be mainly used for driving micro-LED display devices. Not only micro-LED displays but also any other display devices can be driven by PWM control such as a display device with a bi-stable emission device. From a product point of view, the embodiments of the present invention can be used in any kind of displays in consumer electronics, automotive, and industrial products.

For micro-LED display devices, the number of rows*the number of columns is p*q, the Blank Sub-field scheme of the embodiment of the present invention can provide a driving sequence for driving pixels including binary sections and at least one off-section. The binary sections usually have binary relationship but is not restricted to only binary. Other than binary (2-carry) relationship between binary sections, 3-carry, 4-carry, or m-carry relationship also can be used in the Blank Sub-field scheme. The m-carry system means data sections have the multiple relationship: 1, m, m^2, m^3, . . .

According to the embodiments of the present invention, all of p*q pixels in an array of a display device can display correct grey scale colors and the available data driving time is arranged in an optimized way.

The effects and advantages by the embodiments of the present invention are as follows:

The most significant improvement of the embodiments of the present invention is that the available data driving time $T_{DP}$ is increased. The larger $T_{DP}$ makes it easier to drive each pixel with correct data or voltage. So, color performance of the micro-LED is improved.

In the case of the BAG scheme, the equation for calculating $T_{DP}$ is:

$$T_{DP} = \frac{T_{SF}}{CY} = \frac{T_{FRAME}}{CY \times \text{SF\_number}} = \frac{T_{FRAME}}{GSU \times \text{DSW\_sum}} \tag{5}$$

As previously explained with reference to TABLE 10 for the Blank Sub-field scheme, the equation for calculating $T_{DP}$ is:

$$T_{DP} = \frac{T_{SF}}{CY} = \frac{T_{FRAME}}{CY \times \text{SF\_number}} = \frac{T_{FRAME}}{GSU \times (\text{DSW\_sum} - 1) + (\text{Off\_section})} \tag{6}$$

In the case where bit depth is 10 and the number of lines is 960, for the BAG scheme, DSW_sum is 1023, CY is 11, and GSU is selected to 12 so that 1023*12/11=1116 according to equation (2). 1116 is the minimum number of SFs that is greater than or equal to 960 in the BAG scheme. Thus, $T_{DP}$ is 1/60/11/1116=1.358 us according to equation (5) with $T_{FRAME}$ is 1/60, CY=11, and SF_number=1116. On the contrary, $T_{DP}$ of the Blank Sub-field scheme is calculated as 1.578 us according to equation (6) with Off_section=12, and it is longer than $T_{DP}$ in the BAG scheme by 16%.

In the case where bit depth is 12 and the number of lines is 960, for the BAG scheme, DSW_sum is 4095, CY is 13, and GSU is selected to 4 so that 4095*4/13=1260 according to equation (2). 1260 is the minimum number of SFs that is greater than or equal to 960 in the BAG scheme. Thus, $T_{DP}$ is 1/60/13/1260=1.018 us according to equation (5) with $TRA_M$ is 1/60, CY=13, and SF_number=1260. On the contrary, $T_{DP}$ of the Blank Sub-field scheme is calculated as 1.335 us according to equation (6) with Off_section=4, and it is longer than $T_{DP}$ in the BAG scheme by 31%.

TABLE 12 to TABLE 14 show $T_{DP}$ improvement from the BAG scheme (without BSF) to the Blank Sub-field scheme in the following cases: bit depth is 4 and the number of lines is 13 in TABLE 12, bit depth is 10 and the number lines is 960 in TABLE 13, and bit depth is 12 and the number of lines is 960 in TABLE 14.

TABLE 12

$T_{DP}$ Improvement by Blank Sub-field scheme (Bit Depth = 4)

| Driving Scheme | Bit Depth | Number of Lines | CY | GSU | Number of SFs | $T_{SF}$ (ms) | $T_{DP}$ (us) | $\Delta T_{DP}$ % |
|---|---|---|---|---|---|---|---|---|
| Without BSF | 4 | 13 | 5 | 6 | 18 | 0.926 | 185.2 | — |
| With BSF | 4 | 13 | 5 | 4 | 13 | 1.282 | 256.4 | 38.4% |

TABLE 13

$T_{DP}$ Improvement by Blank Sub-field scheme (Bit Depth = 10)

| Driving Scheme | Bit Depth | Number of Lines | CY | GSU | Number of SFs | $T_{SF}$ (us) | $T_{DP}$ (us) | $\Delta T_{DP}$ % |
|---|---|---|---|---|---|---|---|---|
| Without BSF | 10 | 960 | 11 | 12 | 1,116 | 14.93 | 1.358 | — |
| With BSF | 10 | 960 | 11 | 10 | 960 | 17.36 | 1.578 | 16.3% |

TABLE 14

$T_{DP}$ Improvement by Blank Sub-field scheme (Bit Depth = 12)

| Driving Scheme | Bit Depth | Number of Lines | CY | GSU | Number of SFs | $T_{SF}$ (us) | $T_{DP}$ (us) | $\Delta T_{DP}$ % |
|---|---|---|---|---|---|---|---|---|
| Without BSF | 12 | 960 | 13 | 4 | 1,260 | 13.23 | 1.018 | — |
| With BSF | 12 | 960 | 13 | 3 | 960 | 17.36 | 1.335 | 31.3% |

TABLE 12 to TABLE 14 show that by using the Blank Sub-field scheme, the number of SFs can always be set to the same as the number of lines. And then get a larger available data driving time in driving sequence. For different display resolutions, there are different number of lines.

Figure 12:
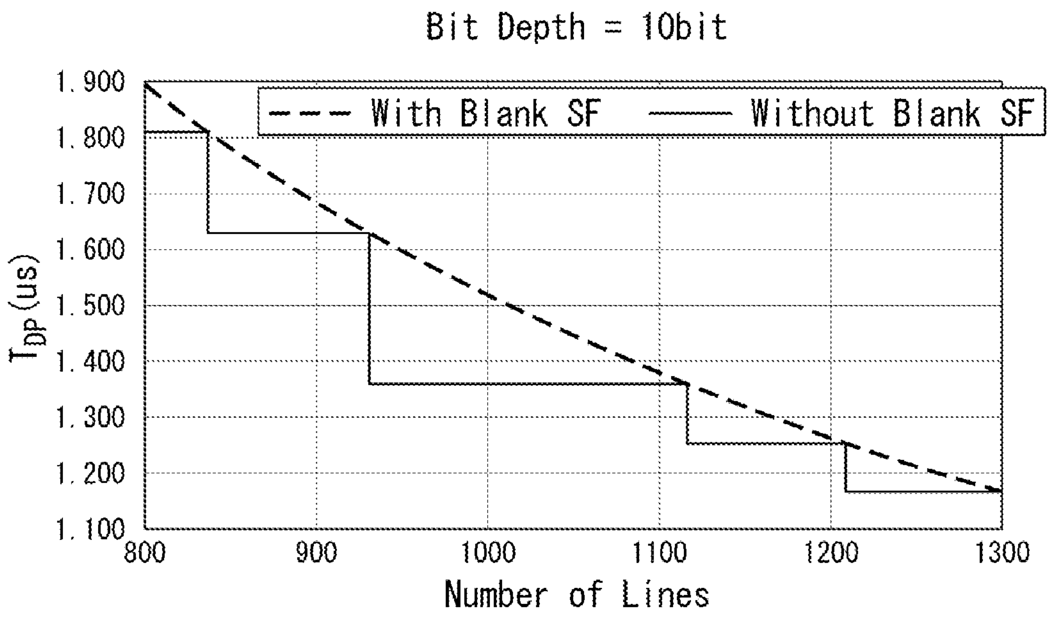
FIG. 12 shows comparison of $T_{DP}$ with bit depth=10 between the Blank Sub-field scheme and the conventional scheme.
Figure 13:
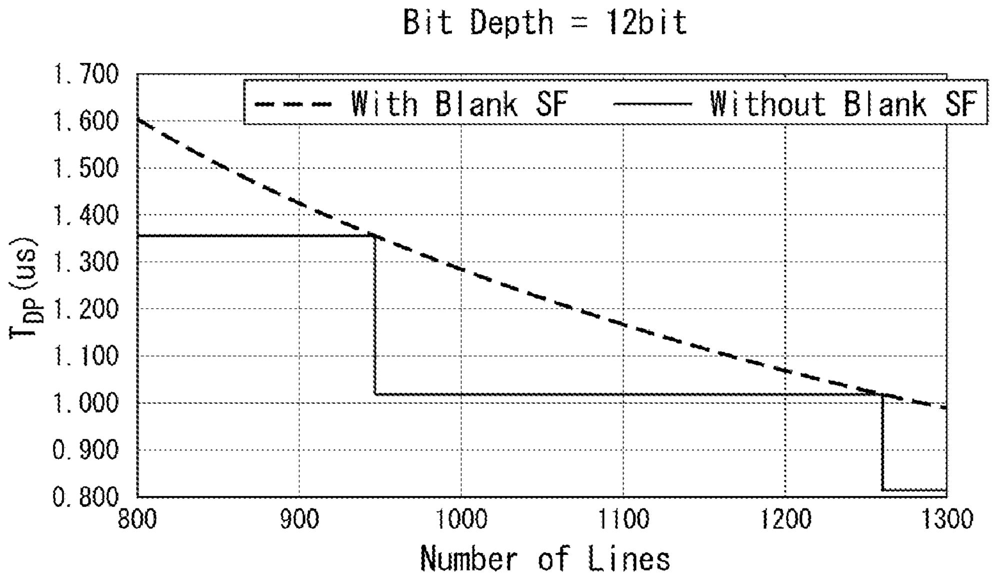
FIG. 13 shows comparison of $T_{DP}$ with bit depth=12 between the Blank Sub-field scheme and the conventional scheme.

FIG. 12 and FIG. 13 show a comparison of $T_{DP}$ between the Blank Sub-field scheme and the conventional scheme for different display devices with the number of lines from 800 to 1,300. The x-axis denotes the number of lines of display devices and y-axis denotes available data driving time $T_{DP}$. We can observe that the shape of the graph for the Blank Sub-field scheme is consecutive and that for the conventional scheme is non-consecutive. For a certain number of lines, the difference in the vertical direction indicates $T_{DP}$ improvement by the Blank Sub-field scheme from the conventional scheme. The timing improvement of the embodiments of the present invention is about 0% to 35%, and depends on the number of lines of display devices.

The embodiments of the present invention can be applied to not only micro-LED displays, but also display devices with other materials using PWM control, digital driving, or analog and digital combined driving.

What is disclosed above is merely exemplary embodiments of the present invention, and certainly is not intended to limit the protection scope of the present invention. A person of ordinary skill in the art may understand that all or some of processes that implement the foregoing embodiments and equivalent modifications made in accordance with the claims of the present invention shall fall within the scope of the present invention.

What is claimed is:

1. An operating method of a display device, the operating method comprising:

driving each pixel for each frame, wherein a plurality of pixels of the display device are disposed in an array of rows and columns, a period of one frame comprises one or more data sections and one or more off-sections, each of the one or more data sections comprises a same time period multiplied by a power of 2, each of the one or more data sections corresponds to an ON period or an OFF period related to a specified brightness, grey scale color, or luminance, each of the one or more off-sections corresponds to an OFF period unrelated to the specified brightness, grey scale color, or luminance, each frame comprises a number of sub-fields, each of the number of sub-fields comprises n+1 units of time, and n is a number of bits of data representing the specified brightness, grey scale color or luminance.

2. The operating method according to claim 1, wherein GSU and Off_section are selected to satisfy the following equation:

$$CY \times SF\_\text{number} = GSU \times (DSW\_\text{sum} - 1) + Off\_\text{section}$$

wherein CY×SF_number corresponds to the period of one frame, SF_number is the number of sub-fields in each frame and is set to a number of the rows, CY is the number of units of time in one sub-field and is set to n+1, GSU is a number of units of time corresponding to a minimum ON period, DSW_sum is a sum of weights of the one or more data sections and is set to 2^n−1, and Off_section is a number of units of time corresponding to the one or more off-sections.

3. The operating method according to claim 1, wherein the driving each pixel for each frame comprises driving each pixel for each frame with pulse-width modulation (PWM).

4. The operating method according to claim 1, wherein the array corresponds to a part of the display device.

5. The operating method according to claim 1, wherein each pixel comprises a thin film transistor (TFT).

6. The operating method according to claim 1, wherein each pixel comprises a silicon substrate.

7. The operating method according to claim 1, wherein Vcc is applied to each pixel in the ON period, and Vss is applied to each pixel in the OFF period.

8. The operating method according to claim 1, wherein the display device is a micro-light emitting diode (LED) display.

9. A display device comprising:

a plurality of pixels disposed in an array of rows and columns, wherein a period of one frame comprises one or more data sections and one or more off-sections, each of the one or more data sections comprises a same time period multiplied by a power of 2, each of the one or more data sections corresponds to an ON period or an OFF period related to a specified brightness, grey scale color, or luminance, each of the one or more off-sections corresponds to the OFF period unrelated to the specified brightness, grey scale color, or luminance, each frame comprises a number of sub-fields, each of the number of sub-fields comprises n+1 units of time, and n is a number of bits of data representing the specified brightness, grey scale color or luminance; and a driver configured to drive each pixel for each frame.

10. The display device according to claim 9, wherein GSU and Off section are selected to satisfy the following equation:

$$CY \times SF\_\text{number} = GSU \times (DSW\_\text{sum} - 1) + Off\_\text{section}$$

wherein CY×SF_number corresponds to the period of one frame, SF_number is the number of sub-field in each frame and is set to a number of the rows, CY is the number of units of time in one sub-field and is set to n+1, GSU is a number of units of time corresponding to a minimum ON period, DSW_sum is a sum of weights of the one or more data sections and is set to 2^n−1, and Off_section is a number of units of time corresponding to the one or more off-sections.

11. The display device according to claim 9, wherein the driver is further configured to drive each pixel for each frame with pulse-width modulation (PWM).

12. The display device according to claim 9, wherein the array corresponds to a part of the display device.

13. The display device according to claim 9, wherein each pixel comprises a thin film transistor (TFT).

14. The display device according to claim 9, wherein each pixel comprises a silicon substrate.

15. The display device according to claim 9, wherein Vcc is applied to each pixel in the ON period, and Vss is applied to each pixel in the OFF period.

16. The display device according to claim 9, wherein the display device is a micro-light emitting diode (LED) display.

17. An operating method of a display device, the operating method comprising:

driving each pixel for each frame, wherein a plurality of pixels of the display device are disposed in an array of rows and columns, a period of one frame comprises one or more data sections and one or more off-sections, each of the one or more data sections comprises a same time period multiplied by a power of 2, each of the one or more data sections corresponds to an ON period or an OFF period related to a specified brightness, grey scale color, or luminance, each of the one or more off-sections corresponds to an OFF period unrelated to the specified brightness, grey scale color, or luminance, and GSU and Off_section are selected to satisfy the following equation:

$$CY \times SF\_\text{number} = GSU \times (DSW\_\text{sum} - 1) + Off\_\text{section}$$

wherein CY×SF_number corresponds to the period of one frame, SF_number is a number of sub-fields in one frame and is set to a number of the rows, CY is a number of units of time in one sub-field and is set to n+1, n is a number of bits of data representing the specified brightness, grey scale color, or luminance, GSU is a number of units of time corresponding to a minimum ON period, DSW_sum is a sum of weights of the one or more data sections and is set to 2^n−1, and Off_section is a number of units of time corresponding to the one or more off-sections.

18. The operating method according to claim 17, wherein the driving each pixel for each frame comprises driving each pixel for each frame with pulse-width modulation (PWM).

19. The operating method according to claim 17, wherein the array corresponds to a part of the display device.

20. The operating method according to claim 17, wherein each pixel comprises a thin film transistor (TFT).

* * * * *